United States Patent Office 3,480,459
Patented Nov. 25, 1969

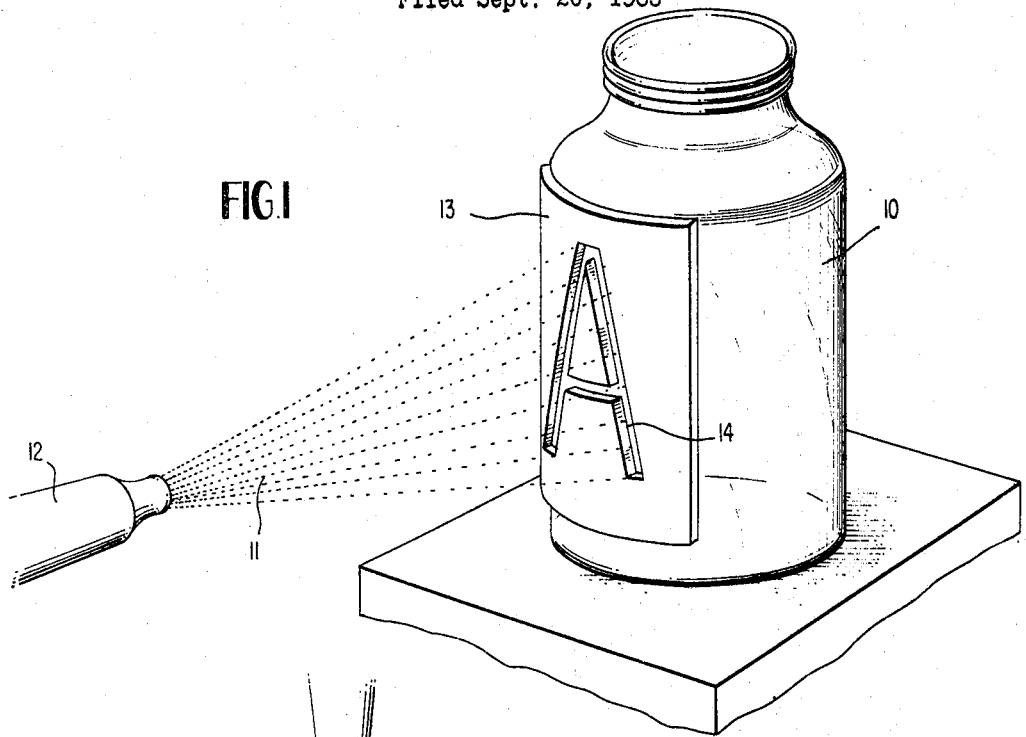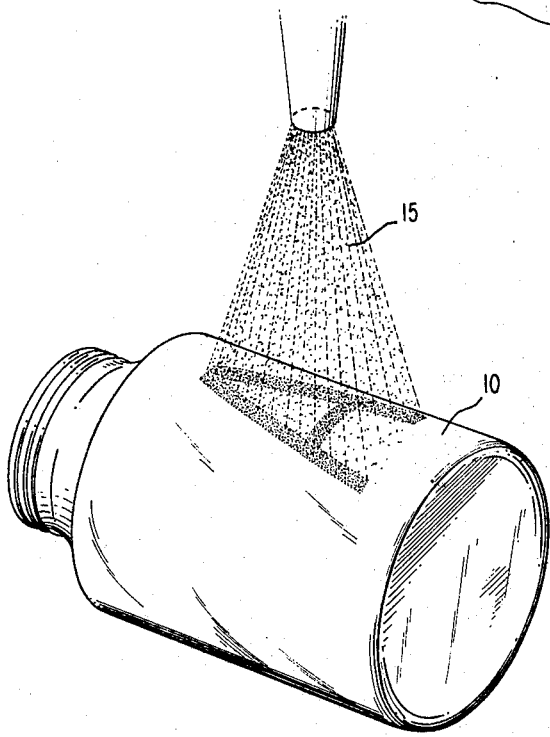

3,480,459
DECORATING ARTICLES UTILIZING HIGH ENERGY RADIATION
Saara K. Asunmaa, Laguna Beach, Calif., and Bernard L. Steierman, Toledo, Ohio, assignors to Owens-Illinois, Inc., a corporation of Ohio
Filed Sept. 20, 1965, Ser. No. 488,685
Int. Cl. G03g *13/00;* B44c *1/06*
U.S. Cl. 117—17.5               10 Claims

ABSTRACT OF THE DISCLOSURE

Glass or glass ceramic members can be decorated by directing high energy radiation in the form of electrons or ions toward the surface of the article, a stencil of the desired pattern and configuration being interposed between the article and the source of the radiation. The radiation is impinged on the surface of the article as permitted by the stencil for a sufficient period of time to develop concentrations of charges in the surface of the article conforming to the configuration of the stencil. Thereafter, the desired decoration is obtained by depositing printing powder onto the surface of the article exposed to the radiation whereby the powder is attracted to and held to the surface of the member in the desired pattern. Subsequently, the printing powder can be permanently fixed to the surface of the member by heating. A copying member may also be employed whereby a pattern is first formed on the copying member and then transferred to the surface to be decorated.

---

The present invention relates to a method for decorating glass or glass-ceramic articles utilizing high energy radiation.

Heretofore, the industry has not developed a suitable method for decorating glass or other ware using radiation. Generally, large dosages of radiation produce some discoloration in glass which has led to the use of selected additives for incorporation into the glass whereby the resistance to discoloration is increased. In operations where the contents of containers require sterilization, such as in the pharmaceutical industry, for example, high energy radiation has been used with considerable success. Of prime concern in these latter operations is the effective sterilization of the contents and hence little attention was paid to the effects of the radiation on the glass container itself other than incorporating materials therein which improve the resistance of the glass to discoloration.

Accordingly, it is the object of the present invention to provide a method for decorating glassware by utilizing radiation.

It is a further object of the present invention to provide a method for treatment of glass surfaces with radiation in order to establish on the glass surface a desired configuration or pattern.

It is a further object of the present invention to decorate glassware or ceramic ware by impinging radiation on the surface of the ware according to a desired pattern and subsequently employing marking material to render visible the desired pattern.

It is a further object of the present invention to provide a method of printing with a glass copying member utilizing radiation to form the desired pattern in the glass copying member.

It is a further object of the present invention to produce a predetermined pattern of charges in an inorganic shaped dielectric body by impinging radiation thereon and subsequently rendering visible the desired pattern.

It is a further object of the present invention to provide a method for subjecting dielectric substances to radiation according to a desired pattern to develop space charges therein which are capable of attracting oppositely charged bodies.

In attaining the above objects, one feature of the present invention resides in subjecting an inorganic dielectric shaped body to radiation according to a desired pattern and configuration whereby concentrations of electrons or charges are produced on the surface and in the subsurface layer of said dielectric body in conformity with the desired pattern and thereafter developing a visible image corresponding to the pattern.

A further feature of the present invention resides in decorating glassware by subjecting said glassware to radiation according to a desired pattern and for a period of time sufficient to develop concentrations of charges on the surface of and in the subsurface layer of the glass and thereafter rendering visible said stored image by depositing oppositely charged marking material onto the surface of the glassware and permanently bonding the marking material to the glassware.

A further feature of the present invention resides in decorating various substrates utilizing a shaped glass body as a copying member and subjecting said glass member to radiation according to the desired decorative pattern, for a sufficient period of time to develop concentrations of charges on the surface of and in the subsurface layer of said glass copying member according to the desired pattern, depositing marking material onto said glass member whereby the marking material is electrically held to said glass member and subsequently transferring said marking material to a substrate according to said pattern and permanently bonding the marking material to said substrate to form the desired decorated substrate.

These and other objects, features and advantages of the present invention will become apparent from the detailed description thereof which follows taken in conjunction with the drawings wherein:

FIG. 1 is a perspective view showing a glass container being subjected to radiation according to a particular pattern, and FIG. 2 is a perspective view showing a deposition of the marking material onto the surface of the radiation-treated glassware whereupon it is held in accordance with the image formed by the surface charges.

Referring now in greater detail to the drawings:

FIG. 1 shows a glass container 10 being subjected to radiation 11 produced from a source of radiation 12 and having interposed therebetween a stencil 13 having the desired pattern cut therein 14 which permits the passage of radiation 11 therethrough to impinge on the surface of the container 10.

FIG. 2 shows the glassware container 10 having been previously treated according to the arrangement described in FIG. 1 wherein marking material 15 is deposited onto the surface of said container and adheres to the surface of the container in the areas which have been exposed to the radiation. Thereafter the marking material is permanently bonded to the container by various means described herein.

In general, any suitable glass material can be utilized according to the methods of the present invention and include, for example, the conventional glasses such as soda lime glass which is normally used for glass containers for bottling various materials. It is to be noted that ceramic, or glass-ceramic articles can also be decorated according to the methods of the present invention.

It is believed that during the bombardment of the glass surface by the radiation, said radiation being primarily a beam of electrons or ions, the electrons pass through the surface of said glass article and migrate away from the radiation source and form concentrations of electrons at various points on the surface of or within the glass body. The moving charged particles; i.e. electrons and ions, produce a charging effect throughout the path. X-rays and photoelectrons are formed and are trapped themselves or knock off electrons from the matrix material which may cause charging effects. In glass, the charging effect remains in the regions where they are formed. The range of one million volt electrons in a material with a density of 3.8 gms./cm.$^3$ is 1.5 millimeters and that of two million volt electrons is 3.3 millimeters. Throughout the path, a charging effect occurs even on the surface. Electrons contained in the atoms of various constituents of the glass may also enter into this migration and concentrate at various points in the body of the article. Areas at which the electrons tend to concentrate are known as barriers and are caused by defects in the glass such as bubbles, areas of impurities, local differences in the composition of glass which can be referred to as concentration barriers, barriers of conductance at the interface of immiscible phases, and the like. The concentration of the electrons at these areas may be referred to as "space charges" which appear in the glass body in the path of the radiation. These space charges will not be formed to a significant extent in those areas of the glass shielded by the opaque portion of the stencil or mask that is interposed between the source of radiation and the dielectric body. The space charges or concentrations of electrons therefore conform to the desired pattern or image.

Customarily, conductive masks, generally metal, are used to form the desired pattern of sub-surface space charges in the glass body. Lead is often used for this purpose. The mask is placed in position to shield those portions of the container which are to be free of decoration. The masks have cut therein the desired patterns so as to permit the radiation to pass through the stencil and impinge on the glass surface thereunder.

Contributing to the formation of the electron concentration are the electrons that are removed from the atoms of various elements contained in the glass itself. These electrons also migrate away from the radiation centers and form concentrations of electron at the barriers.

The space charges persist for a period of time depending on the concentration of electrons and other effects but, in general, persist for a sufficient duration to permit the deposition of marking material or colored developer powder to render visible the image formed in space charges in the glass.

Any source of radiation energy can be used for present purposes provided that it is sufficient to develop charges in the surface of the article. Potentials of these sources can vary widely. For example, one to three million volts in potential is satisfactory. Lower potentials may also be used. For example, 10 kev. will penetrate a substance having a density of 3.815 grams/cm.$^3$ to a distance of 0.9 micron, 100 kev. to 48.8 microns and 500 kev. to 600 microns. These ranges of thickness can be considered to be subsurface layers. The duration of impingement can vary considerably; from about 5 seconds to 10 minutes being satisfactory. One of the advantages of the present invention is that the duration of radiation can be as short as 5 to 10 seconds with good results.

Marking materials of many types can be used for deposition on the treated glassware such as the container as shown in FIG. 2. Most conveniently, they can be any one of the various electrostatic printing powders and developer powders which are available such as pigmented alkyd resins. These marking materials can thereafter be treated such as by heating to cause fusion and permanent bonding to the glass surface so as to render visible the desired pattern. It is to be understood that various marking materials can be utilized as well as methods for firmly adhering and bonding said marking materials to the glassware to form the desired configuration.

In another aspect of the invention, instead of printing directly on a glass container, a shaped glass body such as a sheet or plate is used as a copying member which can then be subsequently used for transferring the desired image or design to any other printable surface or substrate. For example, a suitable stencil or mask formed of conductive metal material and having the desired design cut therein to permit passage of the radiation is interposed between the radiation source and the copying member. This copying member covered with the mask or stencil is then exposed to the radiation to form the sub-surface space charges in the glass copying member according to the desired design in the stencil. Thereafter, the marking material is deposited on the glass copying member, and is held on the glass copying member for a sufficient length of time by the persistance of the space charges.

The glass copying member having the marking material held thereto is then positioned opposite the substrate to be decorated. To transfer the marking material, an electrical field is applied between the substrate and the member. The marking material transfers to the printable substrate because of the greater charge placed on the substrate. The desired pattern and design is thereby formed on said substrate and can be permanently bonded thereto by appropriate means.

An alternate method of transfer can be used by placing the copying member in contact with the substrate. Thereafter, the usual means can be used to bond the marking material to the printable substrate so as to form the desired pattern on said substrate.

It is to be understood that various other modifications can be made without departing from the scope of the present invention. Various glass compositions can be used to form the glass articles and glassware that are treated according to the methods of the present invention. Suitable radiation of at least about 10 kev. can be utilized for the purposes of the present invention. It is also understood that any suitable marking material such as pigmented or colored resin powders can be used as hereinbefore described. The present invention is particularly useful for decorating glassware, ceramic ware, glass-ceramic articles and the like. When carried out utilizing the glass member as a copying member the present invention can be utilized to print on various substrates such as metal, glass and the like.

It is understood that various other modifications will be apparent to and can readily be made by those skilled in the art without departing from the scope and spirit of this invention.

What is claimed is:

1. A method for decorating a shaped glass or glass ceramic member comprising directing high energy radiation in the form of electrons or ions having energy of at least 10 kev. toward the surface of said member, interposing between said member and a source of said radiation a stencil having the desired pattern and configuration to obtain the desired decoration on the surface of said member, and impinging said radiation onto said surface as permitted by said stencil for a sufficient period of time to develop concentrations of electrical charges in the surface of said member conforming to the configuration of said stencil, and thereafter depositing oppositely electrically charged printing powder onto said surface of said member exposed to said radiation, whereby said powder is attracted to and is held to the surface of said member in the desired pattern.

2. In the method as defined in claim 1, the additional step of permanently fixing the powder to the surface of said member to render visible the desired pattern.

3. In the method as defined in claim 2 wherein said powder is affixed to the surface of the article by heating.

4. In the method of claim 1 wherein the printing powder is a thermoplastic powder.

5. In the method of claim 1 wherein the glass is soda-lime glass.

6. In the method of claim 1 wherein the glass is a sheet of glass.

7. In the method of claim 1 wherein the glass is a container.

8. A method of decorating a glass article which comprises directing high energy radiation in the form of electrons or ions having energy of at least 10 kev. toward the surface of the glass article, interposing between said glass article and the source of said radiation a stencil having the desired pattern and configuration to be applied to said glass article, said stencil permitting the passage of said radiation to impinge on said article according to the desired pattern, the radiation which strikes the stencil being thereby prevented from impinging on said article, the radiation penetrating the glass article and concentrating in said article to form a pattern of charges on said article according to the stencil configuration, thereafter and prior to the dissipation of the pattern of charges depositing oppositely charged colored developer powder onto the surface of said glass article, the amount of radiation being sufficient to develop concentrations of charges in the article whereby the developer powder is electrically attracted and held to the surface of said article according to the desired pattern, and heating said surface to fuse and permanently bond said colored developer powder to said surface according to the desired pattern.

9. In the method for decorating a substrate employing a shaped glass body as the copying member which comprises directing high energy radiation in the form of electrons and ions having energy of at least 10 kev. toward the surface of the glass copying member, positioning between the said glass copying member and a source of said radiation a stencil having the desired pattern, said stencil serving to permit the passage of said radiation according to the desired pattern and excluding the radiation which does not conform to the desired pattern, subjecting said glass copying member to said radiation energy according to said desired pattern for a sufficient period of time to permit the concentration of charges to develop on said glass copying member according to the desired pattern, depositing oppositely charged colored developer powder on said glass copying member, the amount of radiation being sufficient to develop concentrations of charges whereby said developer powder is held to said glass copying member according to the desired pattern, positioning said glass copying member having said developer powder held thereto opposite the substrate to be decorated, establishing an electrical field between said copying member and said substrate and causing the developer powder to be transferred from said glass copying member to said substrate, whereby said developer powder is deposited on said substrate according to the desired pattern, heating said developer powder to fuse and permanently bond said powder to said substrate.

10. In the method as defined in claim 9 wherein said developer powder is a colored thermoplastic resin.

References Cited

UNITED STATES PATENTS

| | | | |
|---|---|---|---|
| 2,438,561 | 3/1948 | Kearsley | 117—17 X |
| 2,538,562 | 1/1951 | Gustin et al. | 117—17 X |
| 2,616,961 | 11/1952 | Groak | 250—65.1 X |
| 2,716,048 | 8/1955 | Young | 117—17.5 X |
| 2,746,193 | 5/1956 | Billian | 250—49.5 X |
| 2,951,443 | 9/1960 | Byrne | 117—17.5 X |
| 3,058,443 | 10/1962 | Paton | 117—17 X |
| 3,238,053 | 3/1966 | Morgan | 117—17.5 |
| 3,245,823 | 4/1966 | Mayo | 117—17.5 |
| 3,294,017 | 12/1966 | St. John | 117—17.5 X |
| 3,321,768 | 5/1967 | Byrd | 250—49.5 X |
| 3,340,477 | 9/1967 | Goldmark et al. | 250—49.5 X |
| 3,358,289 | 12/1967 | Lee | 250—49.5 X |

OTHER REFERENCES

Kuan-Han Sun et al., "Coloration of Glass by Radiation" Ceramic Abstracts 1953 p. 187.

American Ceramic Society, "Table of Contents," J. of the Am. Ceramic Society, vol. 43, No. 8, Aug. 1, 1960.

Levy, Paul W., "The Kinetics of Gamma-Ray Induced Coloring of Glass," J. of the Am. Ceramic Society, vol. 43, No. 8, Aug. 1, 1960.

WILLIAM D. MARTIN, Primary Examiner

E. J. CABIC, Assistant Examiner

U.S. Cl. X.R.

117—21.25; 250—49.5